Feb. 18, 1930.    H. W. ROGERS    1,747,558
FILM CONTROL MECHANISM FOR SYNCHRONIZED SOUND AND MOTION PICTURES
Filed Oct. 31, 1927
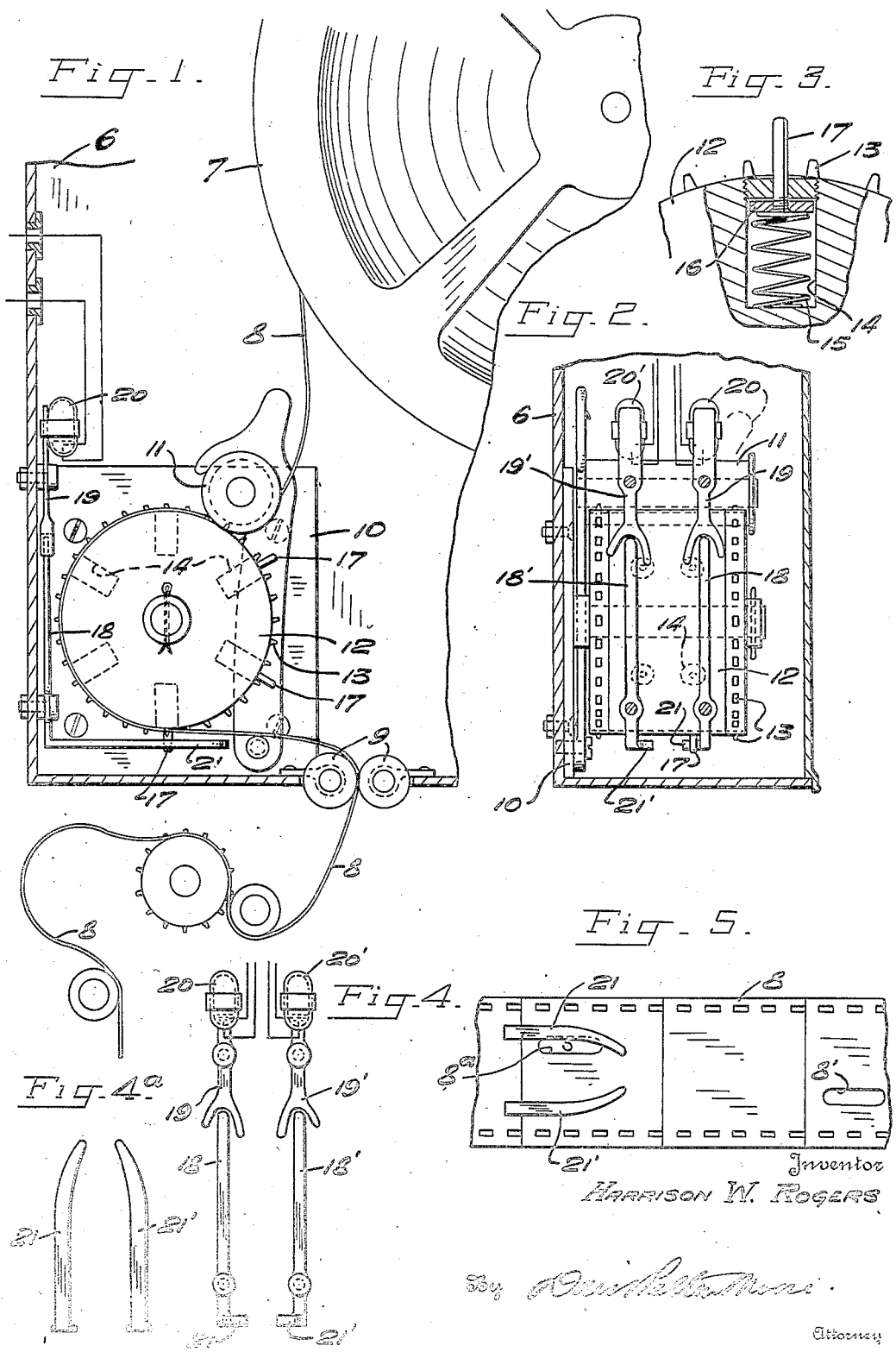

Patented Feb. 18, 1930

1,747,558

UNITED STATES PATENT OFFICE

HARRISON W. ROGERS, OF NEW YORK, N. Y.

FILM-CONTROL MECHANISM FOR SYNCHRONIZED SOUND AND MOTION PICTURES

Application filed October 31, 1927. Serial No. 229,929.

This invention relates to improvements in film-control mechanism for synchronized sound and motion pictures, one object of the invention being the provision of a film-actuated switch controller adapted to be readily connected or attached to the present type of magazine without any serious alteration of the same, and in which are control mercoid switches, thus eliminating the fire hazard.

A further object of this invention is the provision of a device of this character which, although in contact with the film and rotated by the film, is non-destructive to the film, its switch-controlling members, which are bodily carried by the rotary member, being so arranged as to be projected through the film when predeterminedly spaced openings formed in the film arrive at the desired point to throw into operation the sound reproducing mechanism.

In the accompanying drawings:—

Figure 1 is a view, partly in section, of one corner of a film magazine showing the present device is operative relation thereto.

Figure 2 is a view taken from the left looking at the film control mechanism and the mercoid switches, a portion of the magazine being eliminated.

Figure 3 is an enlarged detail view of one portion of the rotary switch-operating member.

Figure 4 is an enlarged detail view of the mercoid switch-carrying members.

Figure 4ᵃ is a detail plan view of the operating arms thereof.

Figure 5 is a plan view of a portion of the film used in conjunction with this device.

Referring to the drawings, the numeral 6 designates the magazine, which is indicative of any form of magazine in general use, and which carries the feeder reel 7, the film 8 being mounted thereon and being provided at predetermined positions with the elongated slots 8' and 8ᵃ which constitute the "start" and "stop" slots for the synchronized pictures.

The rollers 9 are provided in the magazine to guide the film while the frame 10 carries the upper guide roll 11 and the rotating cylindrical switch-operating member 12, the latter of which is provided with a plurality of teeth 13 which engage the usual sprocket holes of the film and around which the film is threaded, as illustrated in Figure 1.

Formed in the periphery of this member 12 are a plurality of radial recesses 14 in each of which is mounted a spring 15 engaging the head 16 of the pin 17 to normally project the same, the tension of the spring, however, being such that when the unperforated film is passing therearound, the pins are seated well within the recesses, but when either one of the slots 8ᵃ or 8' pass over one of the radial slots 14, the spring forces the pin outwardly and through the slot of the film to operate, as will later appear.

As shown clearly in Figures 2 and 4, there are provided two oscillatory levers 18 and 18', whose upper free ends fit the bifurcated ends of the switch-carrying members 19 and 19', each one of which carries its respective mercoid switch 20, 20'. As the respective levers 18, 18' and 19, 19' are pivotally mounted intermediate their ends it is evident that as levers 18 or 18' are swung, due to the pin 17 engaging either one of the hook terminals 21 or 21', the bifurcated end of its respective lever 19 or 19' is moved and mercoid switch tilted into closing or opening position.

From the foregoing, it is evident that when the slot, as for instance, 8', approaches and permits the pin 17 to be projected therethrough, said pin will pass inwardly between the switch members 18 and will engage the inner side of its respective terminal 21, thus rocking the lever 18 and, in consequence, its lever 19, thus tilting the mercoid switch, as, for instance, in Figure 4, to the left, and causing the circuit to be closed to a starting mechanism of any type, and only for an instant sufficiently long to send an impulse out of the line to perform this operation. This would connect or set in motion from the film a sound reproducing mechanism (not shown), while, when the slot 8ᵃ permits the next pin 17 to project through the film, the switch 18' will be operated in a similar manner, and through its circuit controlled by the mercoid switch 20', operate an electromagnet to stop or cut out the sound reproducing machine.

What I claim as new is:—

1. The combination with the magazine of a motion picture projecting machine, of a bodily carried film control switch adapted to be mounted within the magazine to be operably connected to the film, said latter device including, a pivoted lever carrying a mercoid switch in normally open position, an L-shaped lever having one end operably connected with the pivoted lever at the end opposite to the switch, and rotary film actuated means for operating said L-shaped lever by engaging the free end thereof to rock the same and tilt the mercoid switch.

2. The combination with a film magazine, of a film controlled switch mechanism, including a lever pivoted to the magazine, a normally open circuit controlling mercoid switch carried by one end of the lever and tending to return the lever to open circuit position, an L-shaped lever pivoted to the magazine below the first lever and having one end operably engaging the first lever, and film controlled actuating means disposed in the path to engage the other end of the L-shaped lever to move the same to actuate the first lever to tilt the mercoid switch to circuit closing position.

In testimony whereof, I have hereunto set my hand.

HARRISON W. ROGERS.